US008807804B2

(12) United States Patent
Gaeta

(10) Patent No.: US 8,807,804 B2
(45) Date of Patent: Aug. 19, 2014

(54) MINIATURE SMD-HPLED REPLACEABLE LAMP

(76) Inventor: Marco Gaeta, Monza (IT)

( * ) Notice: Subject to any disclaimer, the term of this patent is extended or adjusted under 35 U.S.C. 154(b) by 37 days.

(21) Appl. No.: 13/639,665

(22) PCT Filed: Apr. 4, 2011

(86) PCT No.: PCT/IB2011/000752
§ 371 (c)(1), (2), (4) Date: Oct. 5, 2012

(87) PCT Pub. No.: WO2011/124974
PCT Pub. Date: Oct. 13, 2011

(65) Prior Publication Data

US 2013/0027948 A1 Jan. 31, 2013

(30) Foreign Application Priority Data

Apr. 8, 2010 (IT) .............................. MI2010U0108

(51) Int. Cl.
*B60Q 1/00* (2006.01)

(52) U.S. Cl.
USPC ................. 362/368; 362/311.01; 362/311.02; 362/362

(58) Field of Classification Search
USPC ........................ 362/311.01, 311.02, 362, 368
See application file for complete search history.

(56) References Cited

U.S. PATENT DOCUMENTS

2005/0180157 A1 8/2005 Watanabe et al.
2005/0237747 A1 10/2005 Shimizu et al.
2008/0008427 A1 1/2008 Takeda et al.
2009/0207617 A1 8/2009 Merchant et al.

FOREIGN PATENT DOCUMENTS

WO 2008133889 A1 11/2008
WO 2009104211 A1 8/2009

*Primary Examiner* — Meghan Dunwiddie
(74) *Attorney, Agent, or Firm* — Hoffmann & Baron, LLP

(57) ABSTRACT

A miniature SMD-HPLED replaceable lamp (10) comprising a main body (1) which can be alternatively made of ceramic or metallic material, an electrical connector (20) housed in said main body (1) and a PCB (3*a*) embedding an HPLED lighting source. The connector (20) is suitably designed both for assuring an electrical continuity between PCB (3*a*) and an external power supply and locking it in a slot (2) formed on said main body (1).

9 Claims, 3 Drawing Sheets

MINIATURE SMD-HPLED REPLACEABLE LAMP

This application is the U.S. National Phase of, and Applicants claim priority from, International Application Number PCT/IB2011/000752 filed Apr. 4, 2011 and Italian Patent Application No. MI2010U000108 filed Apr. 8, 2010, each of which are incorporated herein by reference.

DESCRIPTION OF THE INVENTION

The present invention relates to a LED (Light Emitting Diode) lamp that is a lamp having a LED as lighting source, in particular said lighting source is designed for mounting on an PCB (Printed Circuit Board), said PCB being replaceable by user.

As above the lighting source of the LED lamp according to the present invention is a lighting device having a High Power LED—hereinafter HPLED—mounted by manufacturing process, and therefore fixedly, on a PCB provided with every electronic component and all the electric connections to the HPLED, such that it only needs connection of the PCB to an external power supply in order to be operated. This is a conventional manufacturing process adopted for many other electronic device which are commonly referred as surface-mount device or SMD.

Prior art replaceable SMD-LED lamps provide, similarly to solution proposed by the present invention, opportunity to replace the SMD-LED lighting source through simple extraction of the actual SMD-LED from a slideable slot and further insertion of a new SMD-LED within said slot. However no miniature SMD-HPLED replaceable lamp has been so far proposed or known from state of the art: the constructional solution provided by the lamp according to the present invention, conversely, allows to obtain a lamp having a HPLED of fairly small size, that is a miniature HPLED lamp, by reducing to the minimum dimensions of electrical connectors formed on said lamp and necessary for power supplying the lighting source, such connectors being used also for locking the SMD-HPLED on the slot provided therefor. Moreover, the present invention by means of the constructional solution disclosed in the following allows for having all the lighting beam generated by the source at disposal, since the SMD-HPLED is housed flush to an external surface of said lamp. Finally, the same lamp is used as heat sink associated to the SMD-HPLED source, as more clearly disclosed by the following detailed description of preferred embodiments of the miniature SMD-HPLED lamp according to the present invention, the description being taken in conjunction with the annexed drawings in which like reference numerals indicate similar or identical elements. In particular:

The embodiments disclosed in the following can be alternatively adopted mainly on the basis of the material desired for the lamp. Specifically two different materials can be selected: a ceramic material or a metallic material, in particular aluminium. A ceramic material is generally preferred because of its better heat dissipating properties and electrical insulation characteristics which eliminate all risks related to short circuits; on the other hand the ceramic moulding process is not able to grant the surface finish required for all the applications of present invention. Therefore, if a more accurate assembling of lamp parts and components is desired, a metallic material can be adopted and machined so as to obtain an improved manufacturing quality.

Figure 1:
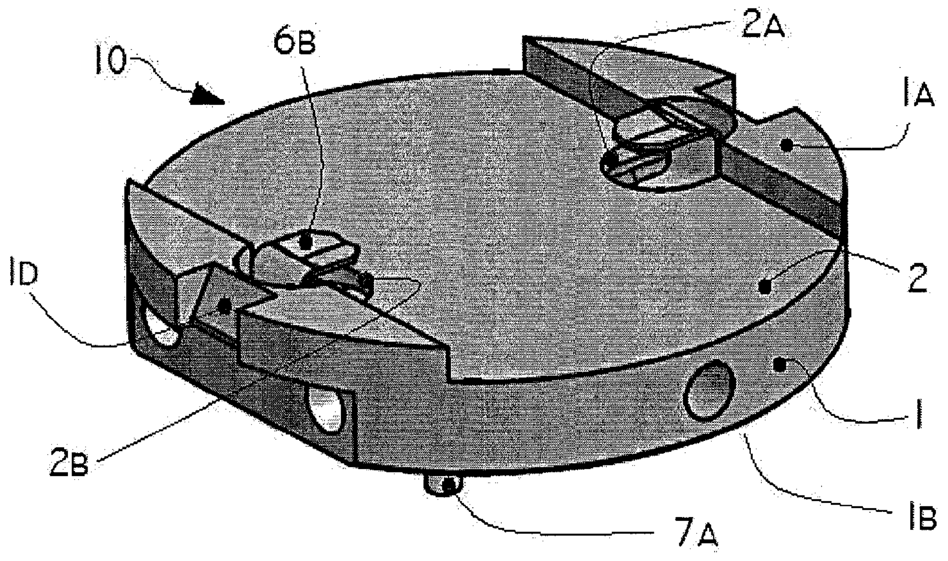
FIG. 1 is a perspective view of the miniature replaceable SMD-HPLED lamp according to a preferred embodiment of the present invention.
Figure 2:
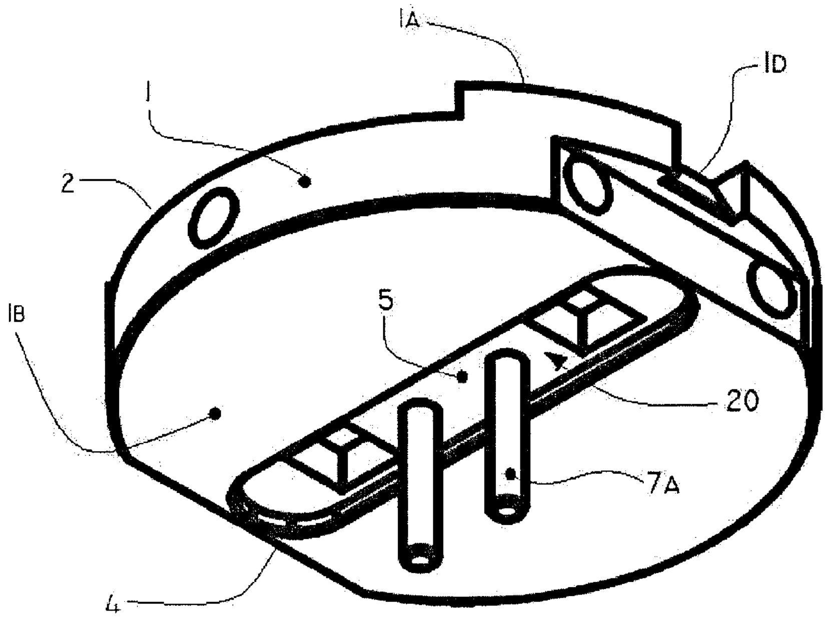
FIG. 2 is a second perspective view of the embodiment in FIG. 1.

With reference now to FIGS. 1 and 2, a miniature replaceable SMD-HPLED lamp 10 is constituted by a ceramic main body 1, a SMD-HPLED 3 and a electric connector 20. The ceramic main body 1 is preferably cylindrically moulded and provided with an upper slot 2 formed thereon. Said upper slot 2, in turn, has an approximatively rectangular shape and a depth equal to thickness of a PCB 3*a* on which the HPLED and its pair of power supply contacts 3*b* are embedded. The upper slot 2 is therefore suitably dimensioned for housing the SMD-HPLED 3, which once inserted into the slot 2 has the PCB 3*a* flush to the upper surface 1*a* of the ceramic main body 1. The upper slot 2 is also provided with a pair of through-holes 2*a* and 2*b* each of them placed midway on one longest side of the same slot 2. As shown in FIG. 2, on the lower surface 1*b* of the main body 1 a substantially rectangular groove 4 is formed having its longest sides displaced along a direction normal to longest side of the slot 2 and its shortest sides under said through-holes 2*a* and 2*b* of the slot 2: according to this configuration the groove 4 results in communication with each through-holes 2*a* and 2*b*.

Figure 3:
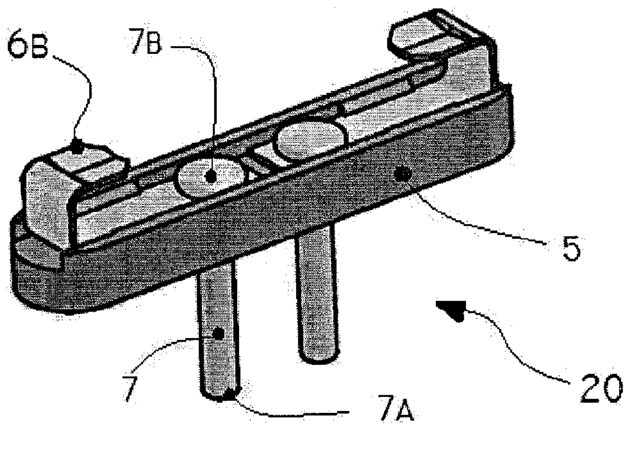
FIG. 3 is a perspective view of an electric component of the embodiment in FIG. 1.

FIG. 3 shows an electric component or connector 20 designed to be inserted and housed into the above disclosed rectangular groove 4: connector 20 comprises an electrical insulating member 5 having a shape conjugated to shape of the groove 4; moreover in the middle portion of said insulating member 5 a pair of through-holes 5*a* is provided. A pair of guides 5*b* is then formed over the insulating member 5, each guide 5*b* placed out of the portion occupied by said pair of through-holes 5*a*. A conductor 6 in the form of a metal band provided, at one end thereof, with a through hole 6*a* is housed in each guide 5*b* such that said through-hole 6*a* is coaxial to said through-hole 5*a*. The conductor 6 is plastically deformed and folded back on itself such that the profile of the metal band results C-shaped; therefore the other end 6*b* of the conductor 6 will be suspended by the vertical side of the C-shaped profile. An electric terminal 7 in the form of a pin is inserted into the through-holes 6*a* of each band 6 and into each through-hole 5*a* of the insulating member 5. In such manner the electrical continuity is achieved from tip 7*a* of each terminal 7 to the end 6*b* of each metal band conductor 6. A head 7*b*, at the end opposite to tip 7*a*, is formed on each terminal 7 such that any vertical movement of the same terminal 7 is avoided; moreover the stem of said terminal 7, i.e. the portion under said head 7*b* being in contact with through-hole 6*a*, is provided with an increased diameter 7*c* which, during assembling, deforms diameter of the through-hole 6*a* and allows an improved coupling thereof. The connector 20 can therefore be inserted into the groove 4 with the conductor ends 6*b* being passed through said pair of through-holes 2*a* and 2*b*. The vertical sides of the metal band C-shaped profile consequently have to be dimensioned such that, at insertion of the SMD-HPLED 3, the connector ends 6*b* are adequately pressed on the power supply contacts 3*b* of the PCB 3*a*. In order to achieve this results, each connector end 6*b* is slightly downwardly further deformed and therefore they result elastically loaded by each power supply contact 3*b*; moreover, each connector 6*b* end has a downwardly directed concavity for further assuring a reliable connection with the below contact 3*b*. In such terms the connector 20 serves not only for power supplying the SMD-HPLED 3 but also for locking it into the slot 2. Finally, distance between each through-holes 5*a* of the pair is advantageously selected in order to have a distance between axes of the terminals 7 complying with electrical connection standards set for G4, G5.3, GX5.3, G6.35 or even GY6.35.

Figure 4:
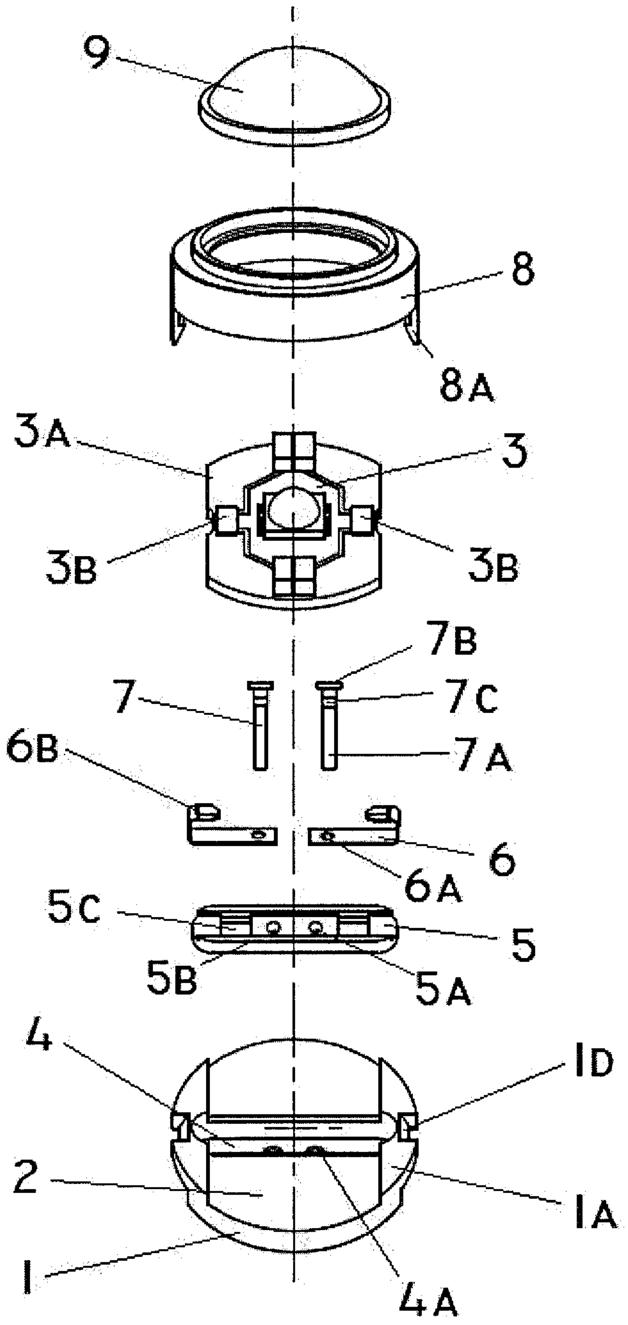
FIG. 4 is an exploded perspective view of the miniature replaceable SMD-HPLED lamp according to an alternative embodiment of the present invention.

In FIG. 4 an alternative embodiment of the present invention is shown: the lamp 10 is constituted by an aluminium main body 1 still having a preferably cylindrical shape: on said cylindrical body a slot 2 is formed with sizes adapted to house a SMD-HPLED 3, namely an approximatively rectangular slot resulting from a face milling of the upper surface 1*a* down to a depth equal to thickness of the PCB 3*a* and for a width smaller than diameter of said aluminium main body 1. Along a direction normal to the longest side of said slot 2, an approximatively rectangular groove 4 having the longitudinal side greater than width of the slot 2 and provided, at its base surface, with a pair of through-holes 4*a* is also milled. Said groove 4 and said through-holes 4*a* are designed so as to house the previously disclosed connector 20, the distance between axes of said through-holes 4*a* being adapted for coaxially receive said terminals 7.

All the disclosed embodiments are provided with a pair of protrusions 1*d* formed on the ceramic or metallic main body 1. Said protrusion 1*d* are arranged so as to be coupled by a snap-fit engagement with a ring 8 which, in turn, supports a lens 9, also shown in the FIG. 4.

The invention claimed is:

1. A miniature SMD-HPLED replaceable lamp comprising:

i. a main body provided with a slot passing through the perimeter of said main body and a groove formed under said slot, ii. a SMD-HPLED housed into said slot and provided with contacts, iii. an insulating member housed in said groove, iv. a pair of metallic band conductors, each of them placed on said insulating member folded back on itself at a first end, said first end elastically loaded by below contact, v. a pair of electrical terminals, each terminal passing through a hole formed at a second end opposite to said first end and a hole of a pair provided on said insulating member.

2. The miniature SMD-HPLED replaceable lamp according to claim 1 in which said groove is facing an upper surface of said main body.

3. The miniature SMD-HPLED replaceable lamp according to claim 1 in which said groove is facing a lower surface of said main body, the groove being in communication with said slot by a pair of holes.

4. The miniature SMD-HPLED replaceable lamp according to claim 1 in which said main body is obtained by a ceramic moulding process.

5. The miniature SMD-HPLED replaceable lamp according to claim 1 in which said main body is made of metallic material, preferably aluminium.

6. The miniature SMD-HPLED replaceable lamp according to claim 1 in which said insulating member is formed by a ceramic moulding process.

7. The miniature SMD-HPLED replaceable lamp according to claim 1 in which said metallic band conductors have a C-shaped profile at said first end.

8. The miniature SMD-HPLED replaceable lamp according to claim 1 also comprising a lens preferably supported by a ring.

9. The miniature SMD-HPLED replaceable lamp according to claim 8 in which said ring is coupled to said main body by a snap-fit engagement.

* * * * *